Patented Mar. 3, 1953

2,630,433

UNITED STATES PATENT OFFICE 2,630,433

FORMOGUANAMINES AND THEIR PREPARATION

Donald W. Kaiser, Old Greenwich, and John J. Roemer, Stamford, Conn., assignors to American Cyanamid Company, New York, N. Y., a corporation of Maine No Drawing. Application September 16, 1950, Serial No. 185,337

4 Claims. (Cl. 260—249.9)

The present invention relates to the preparation of formoguanamines.

It is an object of the invention to prepare a formoguanamine by reacting a dicyanoguanidine with hydriodic acid. Additional objects will be apparent from the discussion hereinafter.

In its broad aspect the invention contemplates reacting dicyanoguanidine, mono- and di aliphatic dicyanoguanidines, and mono- and di-cycloaliphatic dicyanoguanidines, and mono- and di-aralkyl dicyanoguanidines with hydriodic acid under the herein prescribed conditions to form a compound of the formula

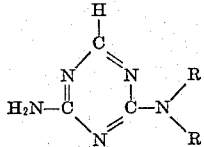

in which R is hydrogen or an aliphatic, cycloaliphatic, or aralkyl radical; the R's can be the same or different. Examples of suitable radicals are methyl, ethyl, propyl, isopropyl, butyl isobutyl, amyl, hexyl, dodecyl, 2-ethylhexyl, cyclohexyl, benzyl, xylyl, phenylethyl, phenylpropyl, mesitylyl, cumyl, and the like.

The substituted dicyanoguanidines can be made by the general method of U. S. Patent 2,371,100, using the corresponding substituted dicyanidiamide, which in turn can be made by the general method of U. S. Patent No. 2,455,807.

In general the invention contemplates heating a dicyanoguanidine with hydriodic acid at a temperature within the range 80°–100° C., the mole ratio of hydriodic acid:free dicyanoguanidine being at least 2:1, and preferably at least 4 or 5:1.

The reagents can be those as offered in commerce, but it is preferred that the dicyanoguanidine be freshly prepared by liberating it from a salt, such as potassium dicyanoguanidine, with an additional equivalent of hydriodic acid. Thus when a monovalent dicyanoguanidine salt is used, at least three equivalents of hydriodic acid must be used per equivalent of said salt, and preferably 5–6. When a divalent dicyanoguanidine salt is used, such as calcium dicyanoguanidine, at least four equivalents of hydriodic acid must be used, two to neutralize the salt, and two to react with the thus-released dicyanoguanidine to form formoguanamine.

The following examples illustrate without limiting the invention.

Example 1

Potassium dicyanoguanidine__ 14.7 g. (0.1 mole)
Hydriodic acid, 47.3%_____ 136 g. (0.5 mole)

The acid was heated to 90° and the potassium dicyanoguanidine was added in 15 minutes at 90°–100° C. The temperature of the dark red reaction mixture was held within this range for an additional fifteen minutes after which it was cooled and filtered. The filtrate was made alkaline and decolorized with sodium bisulfite solution. On filtering and drying 1.8 grams (16.3% yield) of formoguanamine was obtained. On recrystallization from hot water the M. P. was 315° C.

Example 2

Potassium benzyl dicyanoguanidine _____ 23.7 g. (0.1 mole)
Hydriodic acid, 47.3%_____ 136 g. (0.5 mole)

The hydriodic acid was heated to 90° C. and the substituted dicyanoguanidine was added in 15 minutes at 90°–100° C. After ½ hour at 90°–100° C. the dark red reaction mixture was cooled, filtered and made alkaline. From the alkaline solution there was obtained 2 g. of crystalline 4-N-benzyl formoguanamine, a new compound. After recrystallization from isopropanol the compound melted at 170°–175° C.

The compounds produced by the method of the present invention are useful in the preparation of dyes, synthetic resins, pharmaceuticals, and the like.

While the invention has been described with particular reference to specific embodiments, it is to be understood that it is not to be limited thereto but is to be construed broadly and restricted solely by the scope of the appended claims.

We claim:

1. The method that comprises subjecting a member of the group consisting of dicyanoguanidine, mono- and di-aliphatic dicyanoguanidines, mono- and di-cycloaliphatic dicyanoguanidines, mono- and di-aralkyl dicyanoguanidines, the respective dicyanoguanidine substitutent being a hydrocarbon, to the reaction of at least two stoichiometric equivalents of hydriodic acid at a temperature within the range of 80°–100° C. to form the corresponding formoguanamine of the formula

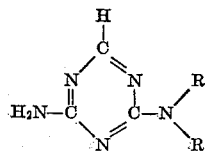

in which R is a member of the group consisting of hydrogen and cycloaliphatic and aralkyl hydrocarbon radicals, and separating the thus-formed formoguanamine from the reaction mass.

2. The method according to claim 1 in which the temperature is about 100° C. and the mole ratio of hydriodic acid to the dicyanoguanidine member is about 5:1.

3. The method according to claim 2 in which dicyanoguanidine is introduced to the reaction by neutralizing a dicyanoguanidine salt with hydriodic acid.

4. The method of preparing N-benzylformoguanamine that comprises subjecting benzyldicyanoguanidine to the action of at least two stoichiometric equivalents of hydriodic acid at a temperature within the range of 80°–100° C.

DONALD W. KAISER.
JOHN J. ROEMER.

REFERENCES CITED

The following references are of record in the file of this patent:

UNITED STATES PATENTS

| Number | Name | Date |
|---|---|---|
| 2,387,547 | Widmer | Oct. 23, 1945 |
| 2,371,100 | Kaiser | Mar. 6, 1945 |

FOREIGN PATENTS

| Number | Country | Date |
|---|---|---|
| 261,813 | Switzerland | Sept. 1, 1949 |
| 261,823 | Switzerland | Sept. 1, 1949 |